(12) United States Patent
Sui et al.

(10) Patent No.: US 12,265,455 B2
(45) Date of Patent: Apr. 1, 2025

(54) TASK FAILOVER

(71) Applicant: INTERNATIONAL BUSINESS MACHINES CORPORATION, Armonk, NY (US)

(72) Inventors: Guang Han Sui, Beijing (CN); Wei Ge, Beijing (CN); Lan Zhe Liu, Beijing (CN); Zhang Li Ping, Beijing (CN); Er Tao Zhao, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 167 days.

(21) Appl. No.: 17/452,787

(22) Filed: Oct. 29, 2021

(65) Prior Publication Data

US 2023/0132831 A1 May 4, 2023

(51) Int. Cl.
| | | |
|---|---|---|
| *G06F 9/46* | (2006.01) | |
| *G06F 9/48* | (2006.01) | |
| *G06F 9/50* | (2006.01) | |
| *G06F 11/07* | (2006.01) | |
| *G06F 11/20* | (2006.01) | |

(52) U.S. Cl.
CPC ............ *G06F 11/203* (2013.01); *G06F 9/461* (2013.01); *G06F 9/485* (2013.01); *G06F 9/4856* (2013.01); *G06F 9/5038* (2013.01); *G06F 11/0709* (2013.01); *G06F 2209/5021* (2013.01); *G06F 2209/509* (2013.01)

(58) Field of Classification Search
CPC .................................................. G06F 9/46–52
See application file for complete search history.

(56) References Cited

U.S. PATENT DOCUMENTS

| | | |
|---|---|---|
| 6,122,752 A | 9/2000 | Farah |
| 7,752,484 B2 | 7/2010 | Goetz |
| 8,266,477 B2 | 9/2012 | Mankovskii |
| (Continued) | | |

FOREIGN PATENT DOCUMENTS

| | | |
|---|---|---|
| CN | 106844083 A | 6/2017 |
| CN | 112463437 A | 3/2021 |
| (Continued) | | |

OTHER PUBLICATIONS

A Cost-Effective Framework for Running Industrial Big Data Analysis Applications in Public Clouds Liduo Lin, Li Pan, and Shijun Liu Date of publication Oct. 22, 2021 (Year: 2021).*

(Continued)

*Primary Examiner* — April Y Blair
*Assistant Examiner* — Paul V Mills
(74) *Attorney, Agent, or Firm* — Anthony Curro (57) ABSTRACT

The present invention relates to a method, system and computer program product for task failover in an unstable environment, wherein the unstable environment includes a plurality of reclaimable nodes. According to the method, it is monitored if any node of the plurality of reclaimable nodes is to be reclaimed. Whether a task on any node of the plurality of reclaimable nodes is recoverable is determined. Responsive to the task being recoverable, data of the recoverable task is stored. Responsive to a node being reclaimed and the task on the reclaimed node being recoverable, at least one associated task of at least one associated node of the reclaimed node is notified to wait.

8 Claims, 7 Drawing Sheets

(56) References Cited

U.S. PATENT DOCUMENTS

| | | | |
|---|---|---|---|
| 8,392,750 | B2 | 3/2013 | Kaul |
| 8,806,490 | B1* | 8/2014 | Pulsipher ............... G06Q 10/10 |
| | | | 718/100 |
| 9,195,528 | B1 | 11/2015 | Sarda |
| 9,417,918 | B2 | 8/2016 | Chin |
| 9,658,887 | B2 | 5/2017 | Chin |
| 9,674,302 | B1* | 6/2017 | Khalid .................... H04L 67/10 |
| 10,960,304 | B1* | 3/2021 | Pare ....................... G06F 11/203 |
| 2012/0137164 | A1* | 5/2012 | Uhlig .................... G06F 9/5083 |
| | | | 714/4.11 |
| 2012/0317579 | A1* | 12/2012 | Liu ..................... G06F 11/1438 |
| | | | 718/104 |
| 2014/0280325 | A1* | 9/2014 | Krishnamurthy ........................... |
| | | | G06F 16/24568 |
| | | | 707/770 |
| 2015/0154046 | A1* | 6/2015 | Farkas ................ G06F 9/45558 |
| | | | 718/1 |
| 2017/0371703 | A1* | 12/2017 | Wagner ................... G06F 9/485 |
| 2018/0203728 | A1* | 7/2018 | Yan ..................... G06F 11/0757 |
| 2020/0004580 | A1 | 1/2020 | Sui |
| 2021/0294651 | A1* | 9/2021 | Misca .................. G06F 9/5061 |
| 2022/0129322 | A1* | 4/2022 | Schwartz ............. G06F 9/5038 |
| 2022/0374276 | A1* | 11/2022 | Mitra ................ G06Q 30/0201 |

FOREIGN PATENT DOCUMENTS

| | | |
|---|---|---|
| CN | 113364603 A | 9/2021 |
| WO | 2015195834 A1 | 12/2015 |
| WO | 2023072252 A1 | 5/2023 |

OTHER PUBLICATIONS

TR-Spark: Transient Computing for Big Data Analytics Ying Yan, Yanjie Gao, Yang Chen, Zhongxin Guo, Bole Chen, Thomas Moscibroda (Year: 2016).*

A survey on optimal utilization of preemptible VM instances in cloud computing Ashish Kumar Mishra, Brajesh Kumar Umrao, Dharmendra K. Yadav (Year: 2018).*

Backup or Not: An Online Cost Optimal Algorithm for Data Analysis Jobs Using Spot Instances Liduo Lin, Li Pan, and Shijun Liu (Year: 2020).*

Optimizing Bioinformatics Variant Analysis Pipeline for Clinical Use Hatem Mohamed Elshazly Chapters 1 and 4-6 (Year: 2016).*

Flint: Batch-Interactive Data-Intensive Processing on Transient Servers Prateek Sharma Tian Guo Xin He David Irwin Prashant Shenoy (Year: 2016).*

A Cost-Effective Framework for Running Industrial Big Data Analysis Applications in Public Clouds (online version) Liduo Lin, Li Pan, Shijun Liu DOI: 10.1109/JIOT.2021.3122196 ieeexplore.ieee.org/abstract/document/9585044/ (Year: 2021).*

SpotCheck: Designing a Derivative IaaS Cloud on the Spot Market Prateek Sharma Stephen Lee Tian Guo David Irwin Prashant Shenoy (Year: 2015).*

Derivative IaaS Layer Utilizing Low Priority Server Instances for Web Applications With State Persistence (Year: 2018).*

FaultTolerance in the Borealis Distributed Stream Processing System Magdalena Balazinska, Hari Balakrishnan, Samuel Madden, and Michael Stonebraker (Year: 2005).*

Beter Safe than Sorry: Grappling with Failures of In-Memory Data Analytics Frameworks Bogdan Ghit and Dick Epema (Year: 2017).*

Notification of Transmittal of The International Search Report and The Written Opinion of the International Searching Authority, or the declaration, International Application No. PCT/CN2022/128265, International filing date: Oct. 28, 2022, Date of Completion: Jan. 13, 2023, mailed Jan. 18, 2023, pp. 1-10.

Amazon, "Amazon EC2 Auto Scaling Capacity Rebalancing," Amazon.com, [accessed Oct. 4, 2021], 8 pgs., Retrieved from the Internet: <https://docs.aws.amazon.com/autoscaling/ec2/userguide/capacity-rebalance.html>.

Amazon, "Cost Optimization Pillar," Amazon Web Service, Jul. 2018, 35 pgs., Retrieved from the Internet: <https://d1.awsstatic.com/whitepapers/architecture/AWS-Cost-Optimization-Pillar.pdf>.

Antonopoulos, et al., "Cloud Computing, Principles, Systems and Applications," Springer, Computer Communications and Networks, 2010, 386 pgs.

Disclosed Anonymously, "Efficient Task Execution and Progress Reporting For Complex Jobs," IP.com Prior Art Database Technical Disclosure, IP.com No. IPCOM000221077D, Aug. 28, 2012, 15 pgs.

Disclosed Anonymously, "Resource Reclaim Optimization for Parent Child Workload," IP.com Prior Art Database Technical Disclosure, IP.com No. IPCOM000253984D, May 22, 2018, 3 pgs.

IBM, "Backfill Parent Task Resources With Child Tasks," IBM.com, [accessed Oct. 5, 2021], 4 pgs., Retrieved from the Internet: <https://www.ibm.com/docs/en/spectrum-symphony/7.2.1?topic=applications-backfill-parent-task-resources-child-tasks>.

IBM, "Parent-child Workload: Advantage IBM Spectrum Symphony," IBM.com, [accessed Oct. 5, 2021], 7 pgs., Retrieved from the Internet: <https://www.ibm.com/support/pages/parent-child-workload-advantage-ibm-spectrum-symphony>.

Kathalkar, et al., "Study of Checkpoint Restore mechanism for Fault Tolerance in Cloud computing," International Journal of Advance Research in Science and Engineering, vol. No. 07, Issue No. 04, Apr. 2018, pp. 237-243.

Mell et al., "The NIST Definition of Cloud Computing", National Institute of Standards and Technology, Special Publication 800-145, Sep. 2011, pp. 1-7.

Poojary, "What Are Your Spot Instance Options on AWS, Azure, and Google?" Six Nines, [accessed Oct. 4, 2021], 7 pgs., Retrieved from the Internet: <https://sixninesit.com/what-are-your-spot-instances-options-on-aws-azure-and-google/>.

* cited by examiner

TASK FAILOVER

BACKGROUND

The present invention generally relates to task processing, and more specifically, relates to methods, systems or computer program products for task failover.

Cloud service providers invest in hardware resources and then release those resources (often on a per-hour basis) to subscribers. One of the problems with this model, however, is that at any given time, there are likely to be compute resources that are not being utilized. These resources represent hardware capacity that cloud service provider has paid for but are sitting idle. Rather than allowing these computing resources to go to waste, cloud service provider offers them at a substantially discounted rate, with the understanding that if someone needs those resources for running a normal instance, that instance will take priority over spot instances that are using the hardware resources at a discounted rate. Spot instances are widely used now. Calculation resources will be provided when free and reclaimed back when there are requests from other subscribers, the price is much lower than that the normal instance charge. Subscribers can run their applications that can be interrupted on such resources to save cost. Therefore, spot instances normally will not be used for running workloads that are mission-critical.

SUMMARY

According to an aspect of the present invention, there is a method, computer program product and/or system that performs the following operations (not necessarily in the following order) for task failover in an unstable environment, wherein the unstable environment includes a plurality of reclaimable nodes, the method comprises: monitoring if any node of the plurality of reclaimable nodes is to be reclaimed; determining whether a task on any node of the plurality of reclaimable nodes is recoverable; responsive to the task being recoverable, storing data of the recoverable task; and responsive to a node being reclaimed and the task on the reclaimed node being recoverable, notifying at least one associated task of at least one associated node of the reclaimed node to wait.

The present subject matter can be advantageous as it may enable providing an optimized failover solution in an unstable environment by determining recoverable task, which may thereby save calculation resources, improve calculation efficiency, reduce response time, or improve user experience.

It is to be understood that the Summary is not intended to identify key or essential features of embodiments of the present invention, nor is it intended to be used to limit the scope of the present invention. Other features of the present invention will become easily comprehensible through the description below.

BRIEF DESCRIPTION OF THE DRAWINGS

Through the more detailed description of some embodiments of the present invention in the accompanying drawings, the above and other objects, features and advantages of the present invention will become more apparent, wherein the same reference generally refers to the same components in the embodiments of the present invention.

DETAILED DESCRIPTION

Some embodiments will be described in more detail with reference to the accompanying drawings, in which the embodiments of the present invention have been illustrated. However, the present invention can be implemented in various manners, and thus should not be construed to be limited to the embodiments disclosed herein. In addition, each of the examples given in connection with the various embodiments is intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the methods and structures of the present invention.

It is to be understood that although this disclosure includes a detailed description on cloud computing, implementations of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
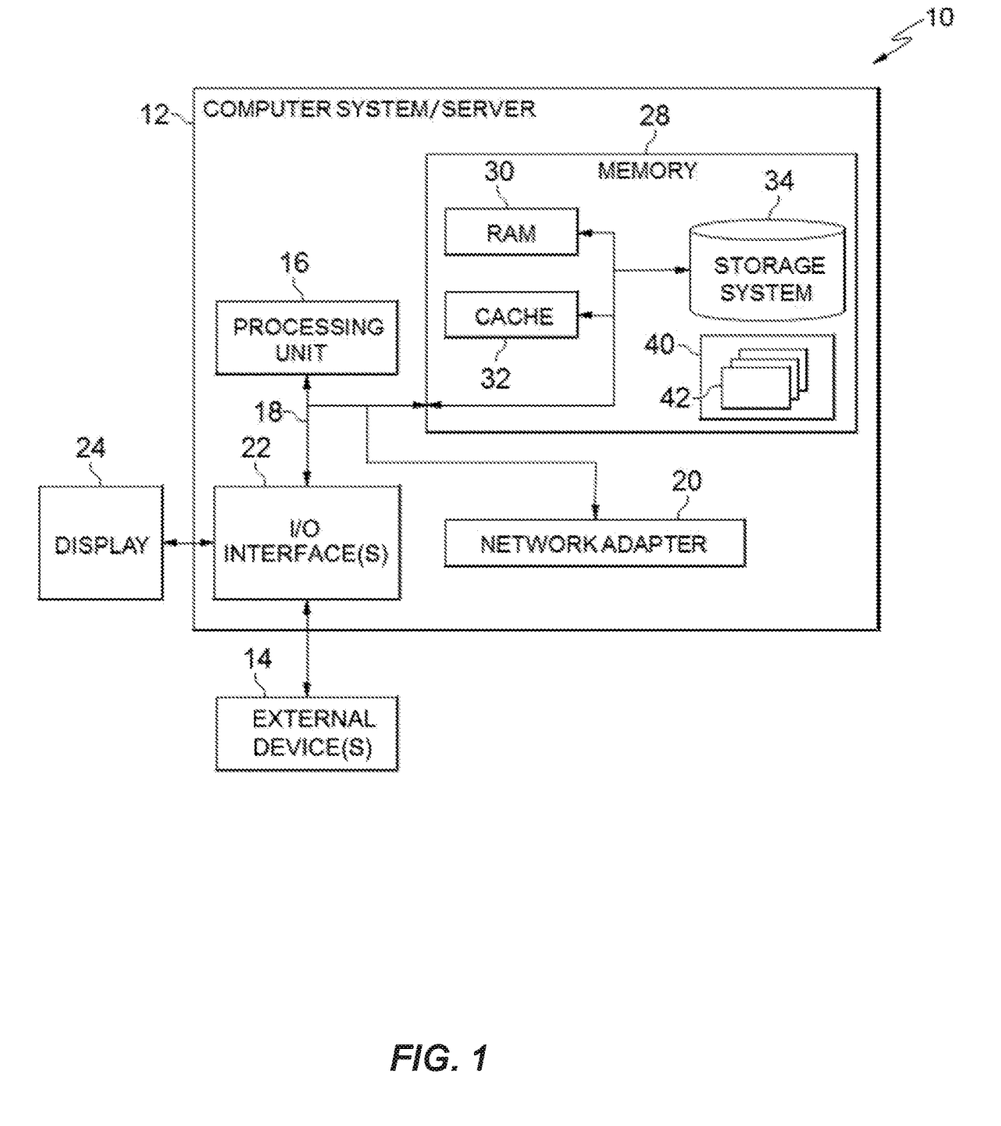
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
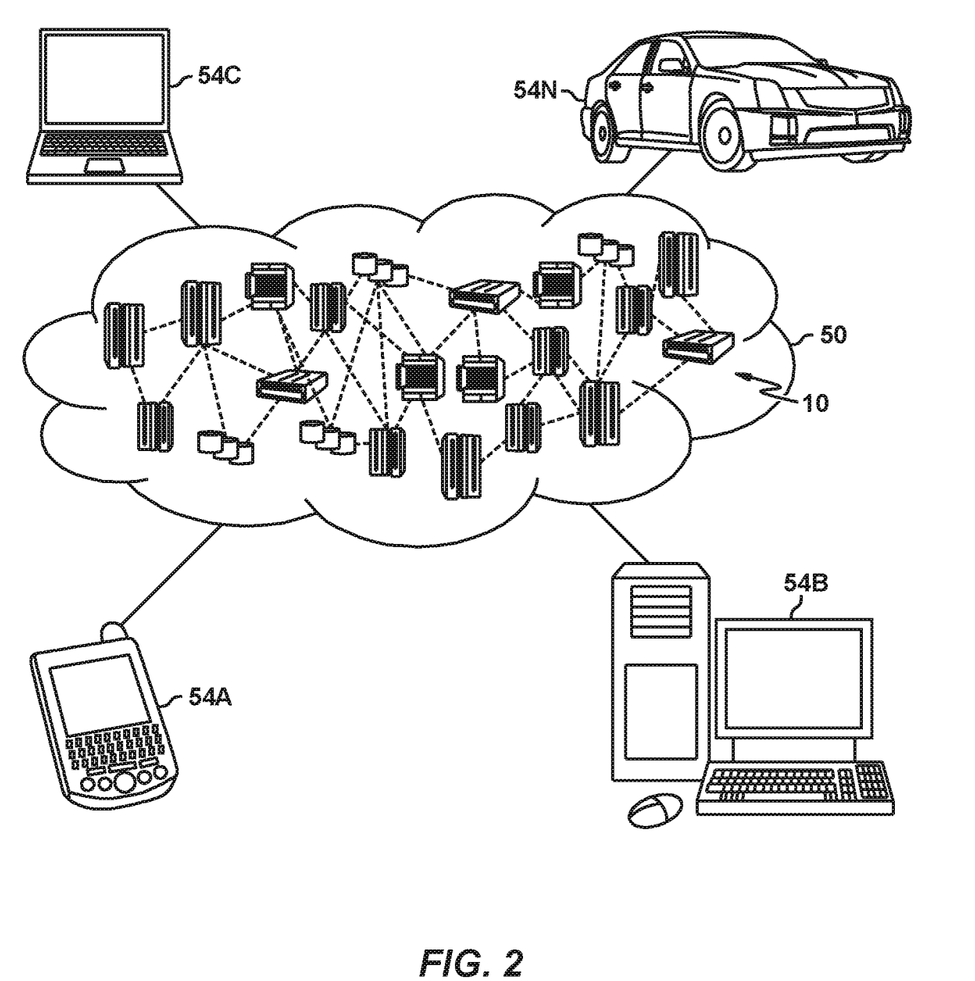
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
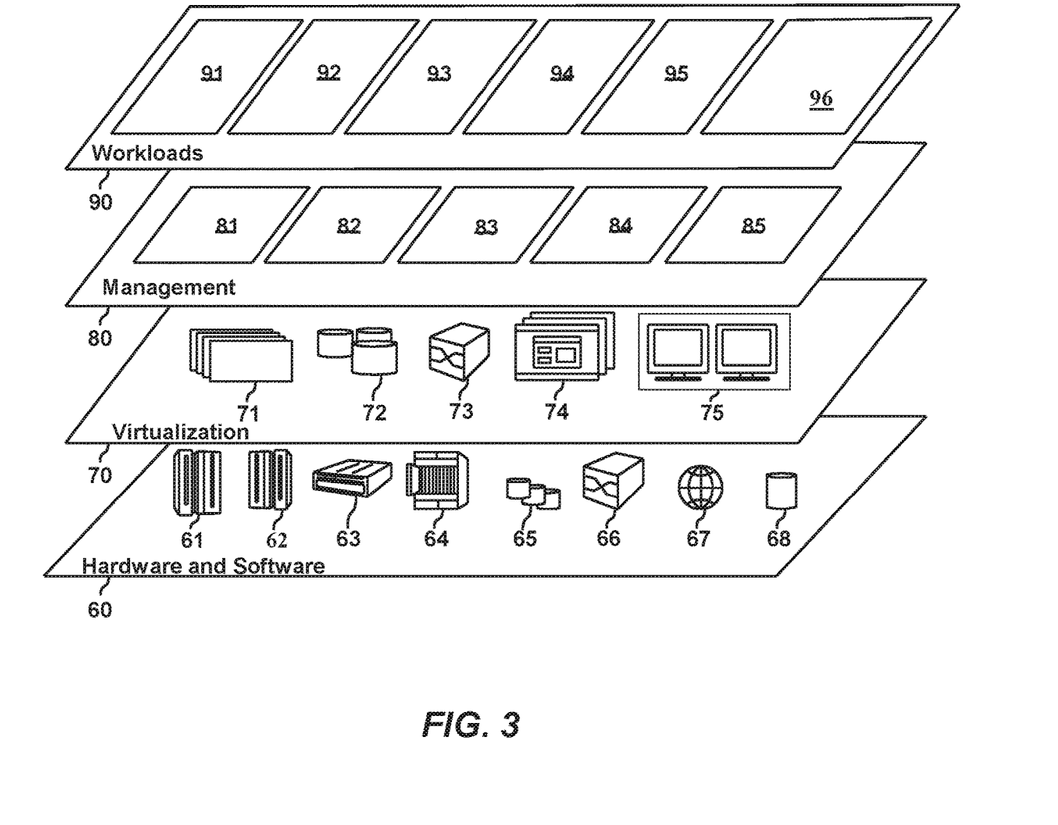
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and task failover 96.

Spot instances are widely used recently, for which calculation resources provided by calculation nodes(hereinafter node) will be provided when free and reclaimed back when there are high priority requests from other subscribers, in return for a low price of service. The drawback is that nodes in the spot instances can be reclaimed back at any time, which also means the data (calculation results) executed on every node may be abandoned at any time, so the nodes in spot instance are unstable and there will be waste of calculation resources.

Parent-child workloads are typically used for data analysis and prediction, wherein one calculation is divided into several parallel tasks to get results. A parent task running on a parent node may be divided into multiple middle tasks to be run on middle nodes, and then a middle task may further be divided into multiple child tasks to be run on multiple child nodes, and so on. Upper level task may rely on the calculation results of lower lever tasks, namely a middle node can only complete its own task after all its child nodes complete their own tasks, and the parent node will complete its own task only after all its middle nodes complete their own tasks. This is known as the parent-child workload pattern. For example, a bank uses this workload pattern to analyze the data to calculate total loan of the whole country (a parent task), middle tasks will be created to calculate the total loan of every state, and child tasks will be created to calculate loan of every city. A task tree grows by this way.

The parent-child workload distribution may also be adopted in spot instances. Once a node running a parent task is reclaimed, task execution on all its child nodes will be stopped, and the calculation resources spent on the reclaimed node and tasks of all its child nodes will be wasted. Workload scheduler will re-assign the task and associated child tasks to other nodes for repeating previous calculation. Of course, if any of the other nodes being reclaimed, the task needs to be re-assigned again. Therefore subscribers may need to wait for longer time to get a result required with reduced predictability.

In order to address at least one problem described above, at least one aspect of the present invention is to provide a method of optimized task failover.

Figure 4:
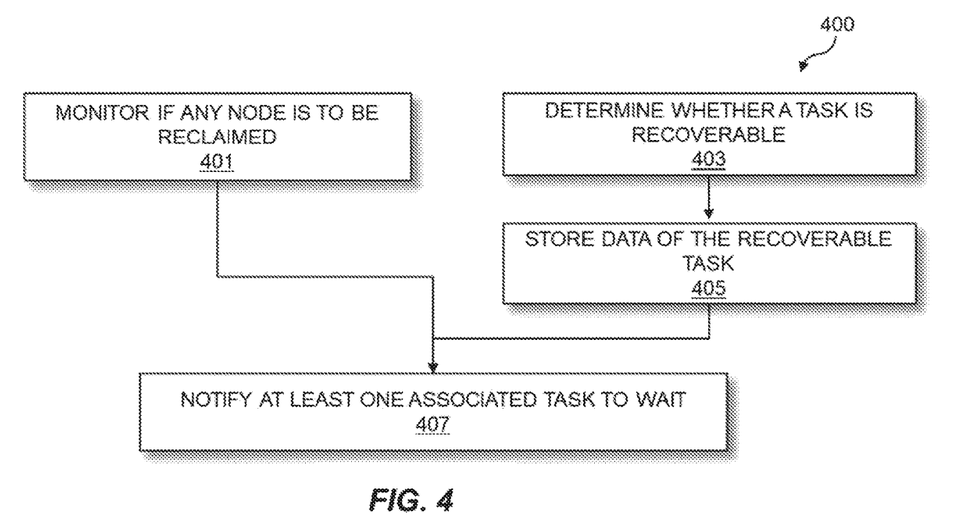
FIG. 4 depicts a flowchart for task failover in accordance with an embodiment of the present invention.

FIG. 4 depicts a flowchart for task failover in accordance with an embodiment of the present invention. As depicted in FIG. 4, a process 400 includes an example process for task failover in an unstable environment, wherein the unstable environment includes a plurality of reclaimable nodes. The process 400 may begin in a step 401 with a processing unit monitoring if any node of the plurality of reclaimable nodes is to be reclaimed. In an unstable environment, such as spot instances, a node may be reclaimed for executing other tasks, therefore all existing tasks (including calculation results) executed on the reclaimed node and associated tasks executed on all of its child nodes will be abandoned, which can result in a big waste of calculation resources and delay of response.

Figure 8:
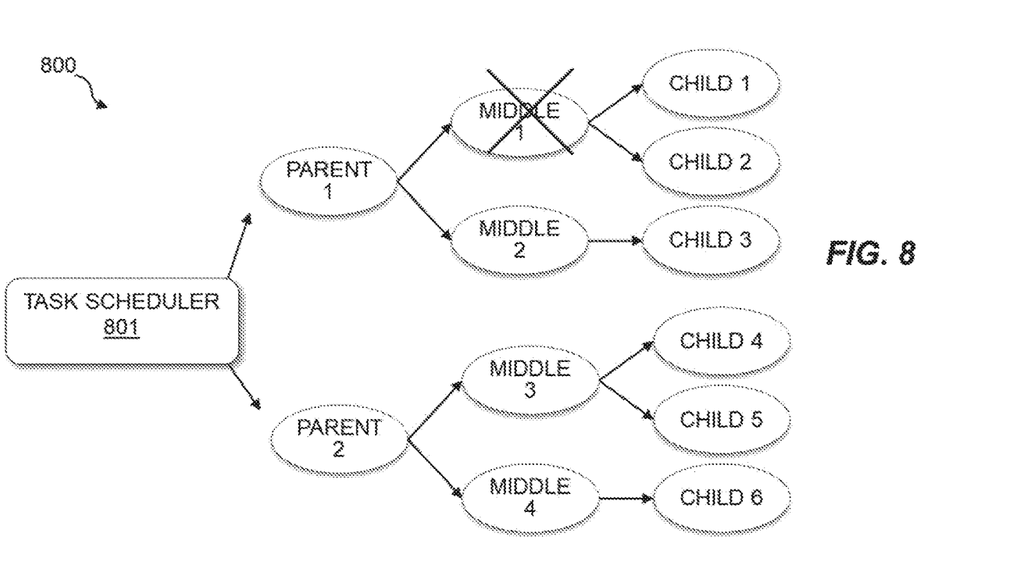
FIG. 8 depicts an example diagram of an unstable environment wherein a middle node is to be reclaimed.

FIG. 8 depicts an example diagram of an unstable environment 800 wherein a middle node (MIDDLE 1) is to be reclaimed. Specifically, task scheduler 801 can assign tasks to a parent node (PARENT 1 and/or PARENT 2). The parent node (PARENT 1 and/or PARENT 2) can further distribute the task(s) to its corresponding child nodes (MIDDLE 1, MIDDLE 2, MIDDLE 3 and MIDDLE 4) respectively. Additionally, MIDDLE 1, MIDDLE 2, MIDDLE 3 and MIDDLE 4 can further distribute their task(s) further to their child nodes (CHILD 1, CHILD 2, CHILD 3, CHILD 4, CHILD 5 and CHILD 6) respectively. For the purpose of simplicity, only three tiers of nodes are shown, and within each tier, only limited number of nodes are shown. It is understood for those skilled in the art that fewer or more nodes with fewer or more tiers can be implemented in different embodiments according to actual business needs. Cross "X" can indicate that the MIDDLE 1 is to be reclaimed for executing other tasks, therefore associated task(s) executed on its child node, namely CHILD 1 and CHILD 2, may also be exited with all corresponding data stored in CHILD 1 and CHILD 2 being abandoned as well.

Back to FIG. 4, in a step 403, a processing unit can determine whether a task on any node of the plurality of reclaimable nodes is recoverable. Once a task being determined recoverable, the associated node may not be simply reclaimed with all associated data(namely calculation results) being abandoned directly.

Therefore, if the task is quite important, or if there will be a big waste if corresponding calculation results are directly abandoned, or if the user experience will be deeply harmed if corresponding calculation results are directly abandoned, the task may be defined as the recoverable task. In accordance with embodiments of the present invention, the determination is made based on at least one of the following factors associated with the task on the reclaimed node: task execution time, a task execution percentage, a task execution result size, a number of child nodes, and a number of times of task re-execution. Specifically, if a task has been executed for a period longer than a threshold A (such as 1 hour), then the task may be defined as a recoverable task; if a task has been executed for a percentage higher than a threshold B (such as 90%), then the task may be defined as a recoverable task; if a task execution result size is bigger enough, such as bigger than a threshold C, then the task may be defined as a recoverable task; if there are too many child nodes, such as the number of child nodes is bigger than a threshold D, which means there will be a huge impact if associated task execution in all child nodes are killed in the same time, then the task may be defined as a recoverable task; or if a task has been re-executed for many times due to node reclamation (such as times of task re-execution is larger than a threshold E), further delay may result in unpleasant user experience, then the task may also be defined as a recoverable task. It should be understood by a person skilled in the art that above criteria of determining a recoverable task is only provided for reference without any limitation to the scope of the present invention.

In a step 405, responsive to the task being recoverable, a processing unit can store data of the recoverable task, for example, in a remote storage. The term "remote storage" can refer to a storage accessed via a network, it can provide the option to store data in a persistent, remote storage device. The data of the recoverable task, namely calculation results (including intermediate results), can be stored so that repeated calculation can be avoided to save unnecessary waste of calculation resources.

In accordance with embodiments of the present invention, the step 403 and the step 405 can be performed in parallel with the step 401. Or in other words, the step 403 and the step 405 can be independent from the step 401, so that data of the recoverable task can be stored regularly or from time to time. Therefore, once a node is to be reclaimed, no need to spend additional time to store the data of the recoverable task, or in other words, a reclaimable node can be reclaimed at any time without additional delay for data storing.

In a step 407, responsive to a node being reclaimed and the task on the reclaimed node being recoverable, a processing unit can notify at least one associated task of at least one associated node of the reclaimed node to wait. In accordance with embodiments of the present invention, an associated node of the reclaimed node is selected from at least one of the following nodes: a parent node of the reclaimed node, and a child node of the reclaimed node. For example, if the reclaimed node has both parent nodes and child nodes, associated tasks executed on both parent nodes and child nodes may be notified to wait; if the reclaimed node has no parent nodes (for example, the reclaimed node itself is a root node), then only associated task(s) executed on child nodes may be notified; while if the reclaimed node has no child nodes, then only associated task(s) executed on parent nodes may be notified.

Figure 5:
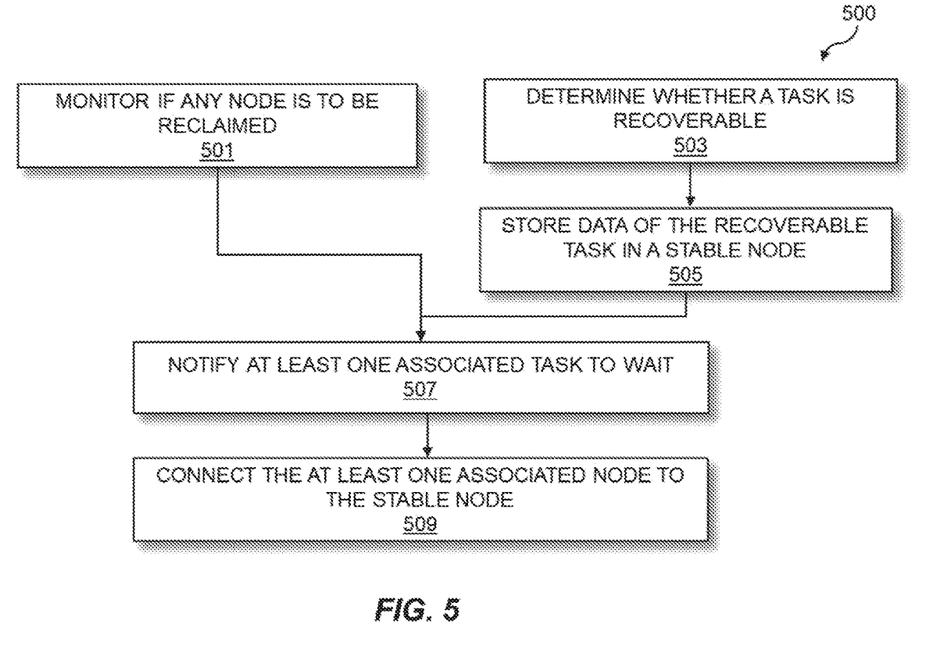
FIG. 5 depicts a flowchart of task failover for a recoverable task in accordance with a more detail embodiment of the present invention.

FIG. 5 depicts a flowchart of task failover process 500 for a recoverable task in accordance with a more detail embodiment of the present invention. In this embodiment, the reclaimed node can be replaced with a stable node, which will not be reclaimed again to interrupt the task execution again. In a step 501, a processing unit can monitor if any node of the plurality of reclaimable nodes is to be reclaimed. In a step 503, a processing unit can determine whether a task on any node of the plurality of reclaimable nodes is recoverable. In a step 505, responsive to the task being recoverable, a processing unit can store data of the recoverable task. Furthermore, the step 505 can further comprise storing the data of the recoverable task in a stable node. In accordance with embodiments of the present invention, the step 503 and the step 505 can be performed in parallel with the step 501. In a step 507, responsive to a node being reclaimed and the task on the reclaimed node being recoverable, a processing unit can notify at least one associated task of at least one associated node of the reclaimed node to wait. Since step 501, step 503, step 505 and step 507 in process 500 represent the same or similar steps of step 401, step 403, step 405 and step 407 of FIG. 4 respectively, so details of those steps will not be further repeated hereinafter for the purpose of simplicity.

In a step 509, a processing unit can connect the at least one associated node of the reclaimed node to the stable node, so that the stable node can take over the recoverable task executed previously on the reclaimed node and continue to communicate with the former parent node and former child node(s) of the reclaimed node.

Figure 9:
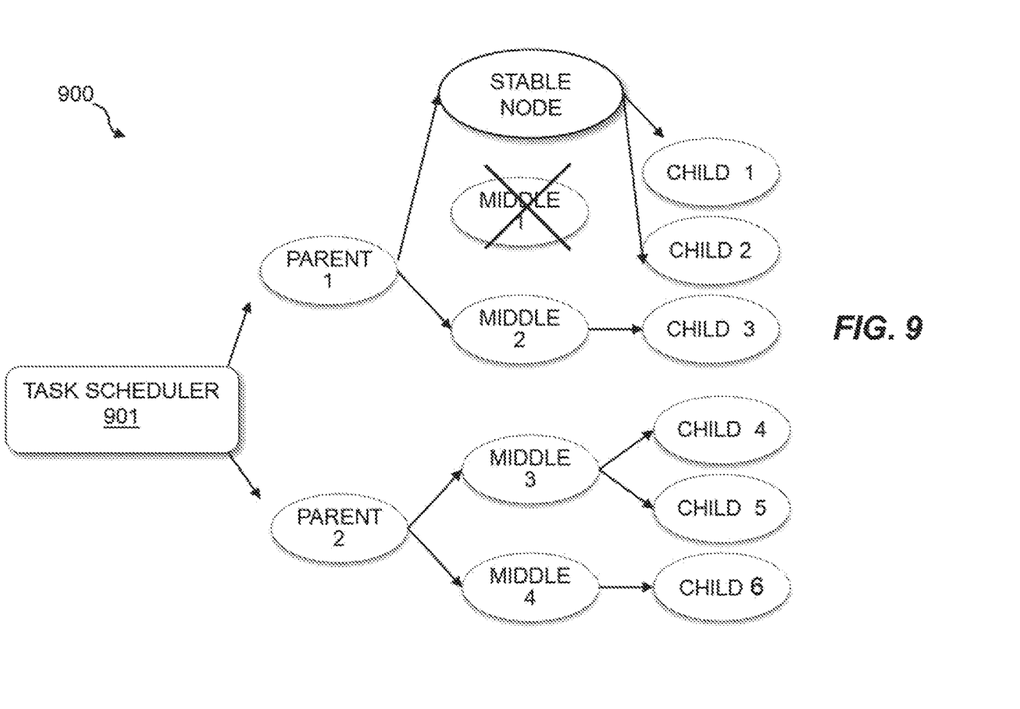
FIG. 9 depicts an example diagram of task failover in an unstable environment in accordance with a more detail embodiment of the present invention.

FIG. 9 depicts an example diagram of task failover in an unstable environment 900 in accordance with a more detail embodiment of the present invention. The unstable environment may also include a STABLE NODE. Similar to FIG. 8, the middle node (MIDDLE 1) is a reclaimed node, and at least one task executed in the MIDDLE 1 is a recoverable task, the STABLE NODE will, therefore, take over task execution of the recoverable task previously run in the MIDDLE 1, and the parent node (PARENT 1) will be a new parent node of the STABLE NODE, and the child nodes (CHILD 1 and CHILD 2) will be new child nodes of the STABLE NODE. Since all the data associated with the recoverable task in the MIDDLE 1 will be migrated to the STABLE NODE, all previous calculation results associated with the recoverable task can be saved without being wasted, and further task execution in the STABLE NODE can be secured. Furthermore, delay of task execution will be reduced because the STABLE NODE can continue task execution of the recoverable task in response to the task migration being completed and the STABLE NODE will not be further reclaimed. It should be noted that the data migration is performed on task level basis, therefore, data related to any unrecoverable task may not need to be migrated to the STABLE NODE.

In accordance with another embodiment, the reclaimed node can be replaced with an unstable node, namely reclaimable node. The step 405 of FIG. 4 of storing data of the recoverable task can further comprise storing the data of the recoverable task in an unstable node, and the process 400 can further comprise connecting the at least one associated node of the reclaimed node to the unstable node. Since all other steps in this embodiment is the same or quite similar to the one described with reference to FIG. 5, except the stable node in embodiments of FIG. 5 is replaced with the unstable node, so all other details will not be repeated for the purpose of simplicity.

Figure 10:
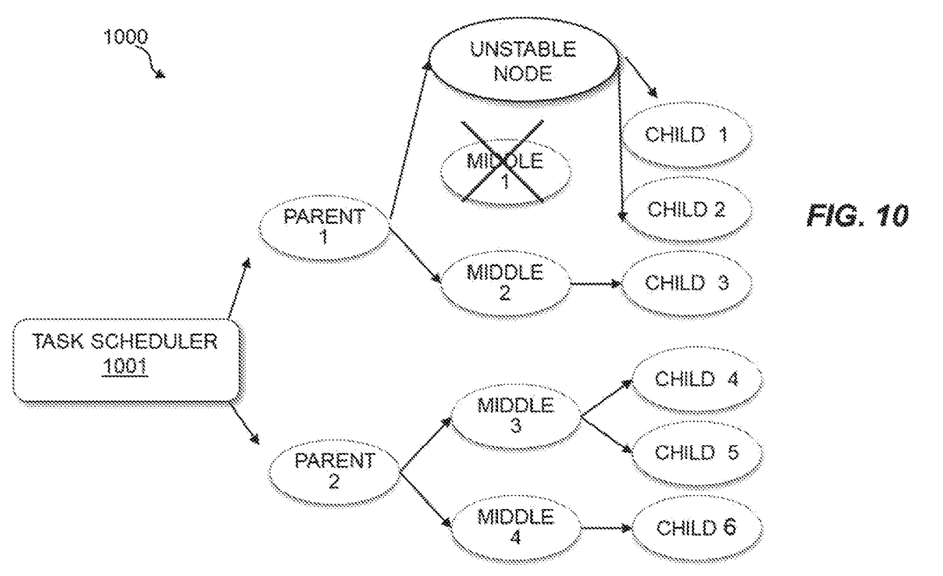
FIG. 10 depicts an example diagram of task failover in an unstable environment in accordance with another more detail embodiment of the present invention.

FIG. 10 depicts an example diagram of task failover in an unstable environment 1000 in accordance with another more detail embodiment of the present invention. Similar to FIG. 8, the middle node (MIDDLE 1) is a reclaimed node, and at least one task executed in the MIDDLE 1 is a recoverable task, the UNSTABLE NODE will, therefore, take over task execution of the recoverable task previously run in the MIDDLE 1, and parent node (PARENT 1) will be a new parent node of the UNSTABLE NODE, and the child nodes (CHILD 1 and CHILD 2) will be new child nodes of the UNSTABLE NODE. Since all the data associated with the recoverable task in the MIDDLE 1 will be migrated to the unstable node, all previous calculation results associated with the recoverable task can be saved without being wasted, and corresponding task execution of the recoverable task on the UNSTABLE NODE, as well as the PARENT 1, CHILD 1 and CHILD 2 can be continued in response to the data migration being completed.

Figure 6:
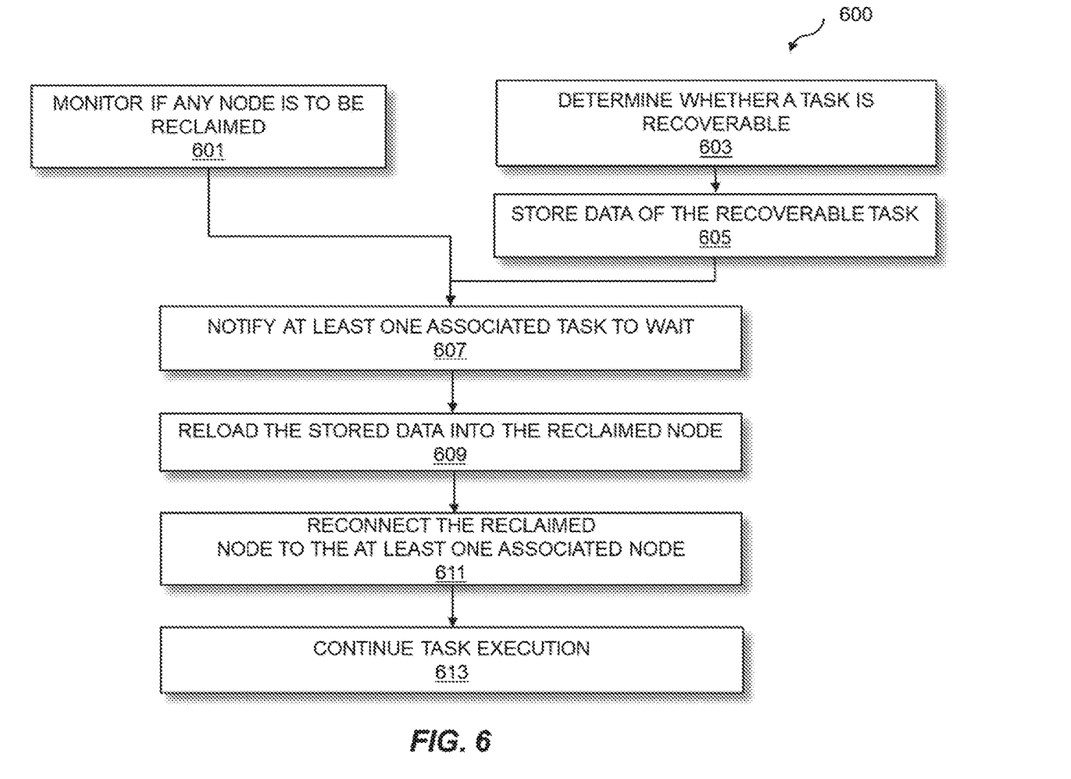
FIG. 6 depicts a flowchart of task failover for a recoverable task in accordance with another more detail embodiment of the present invention.

FIG. 6 depicts a flowchart of task failover process 600 for a recoverable task in accordance with another more detail embodiment of the present invention. In this embodiment, the reclaimed node may not be replaced by any other node, while associated tasks executed on associated nodes of the reclaimed node will wait until the reclaimed node is returned. In a step 601, a processing unit can monitor if any node of the plurality of reclaimable nodes is to be reclaimed. In a step 603, a processing unit can determine whether a task on any node of the plurality of reclaimable nodes is recoverable. In a step 605, responsive to the task being recoverable, a processing unit can store data of the recoverable task remotely. In accordance with embodiments of the present invention, the step 603 and the step 605 can be performed in parallel with the step 601. In a step 607, responsive to a node being reclaimed and the task on the reclaimed node being recoverable, a processing unit can notify at least one associated task of at least one associated node of the reclaimed node to wait. Since step 601, step 603, step 605 and step 607 in process 600 represent the same or similar steps in step 401, step 403, step 405 and step 407 of FIG. 4 respectively, so details of those steps will not be further repeated hereinafter.

Responsive to the reclaimed node being returned, in a step 609, a processing unit can reload the stored data of the recoverable task into the reclaimed node, so that task execution of the recoverable task on the reclaimed node can be continued starting from where it is left of In a step 611, a processing unit can further reconnect the reclaimed node to the at least one associated node which was disconnected from the reclaimed node before. In a step 613, a processing unit can continue the execution of the recoverable task on the reclaimed node and the execution of associated tasks executed on the at least one associated node. In accordance with this embodiment, data related to the recoverable task will not be abandoned, so that calculation resource can be saved.

Figure 11:
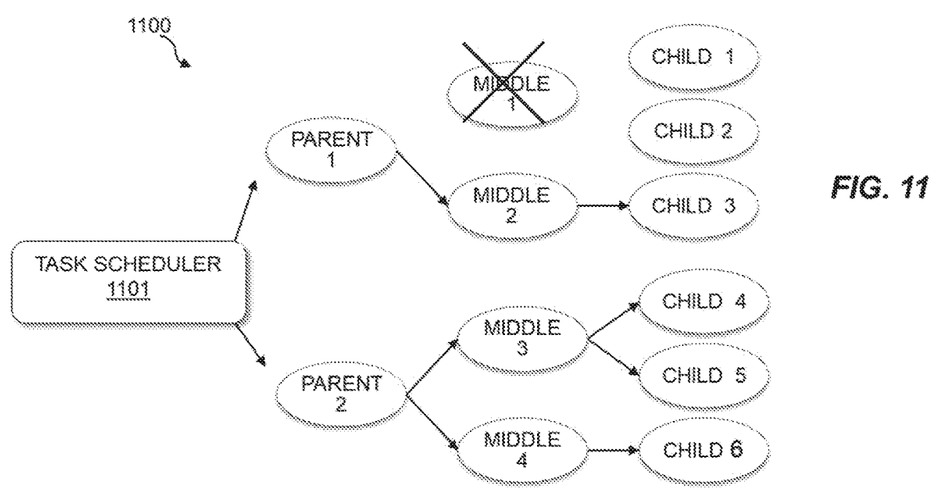
FIG. 11 depicts an example diagram of task failover in an unstable environment in accordance with a further detail embodiment of the present invention.

FIG. 11 depicts an example diagram of task failover in an unstable environment 1100 in accordance with a further more detail embodiment of the present invention. Similar to FIG. 8, the middle node (MIDDLE 1) is a reclaimed node, and at least one task executed in the MIDDLE 1 is a recoverable task. When the MIDDLE 1 is reclaimed for other tasks, task execution associated with the recoverable task in the parent node (PARENT 1) and the child nodes (CHILD 1 and CHILD 2) will all be suspended until the MIDDLE 1 is returned. Of course, the data related to the recoverable task in the reclaimed node will be stored temporarily (such as a remote storage) and reloaded into the reclaimed node once it is returned.

Back to FIG. 6, in a further embodiment of the present invention, corresponding task execution on a short running child node of the reclaimed node can be exited, so that the calculation resource of the short running child node can be released for executing other tasks. Specifically, the step 607 can further comprise notifying associated tasks of a parent node and a long running child node of the reclaimed node to wait. And the process 600 can further comprise additional steps of exiting corresponding task execution on a short running child node of the reclaimed node, and determining a backup node of the short running child node. Those additional steps can be performed between the step 607 and the step 611. And the step 611 can further comprise reconnecting the reclaimed node with at least one of the following nodes: the parent node, the long running child node, and the backup node of the short running child node. It should be noted that the criteria for determining short running child node and long running child node can be determined based on actual technical/business needs.

Figure 7:
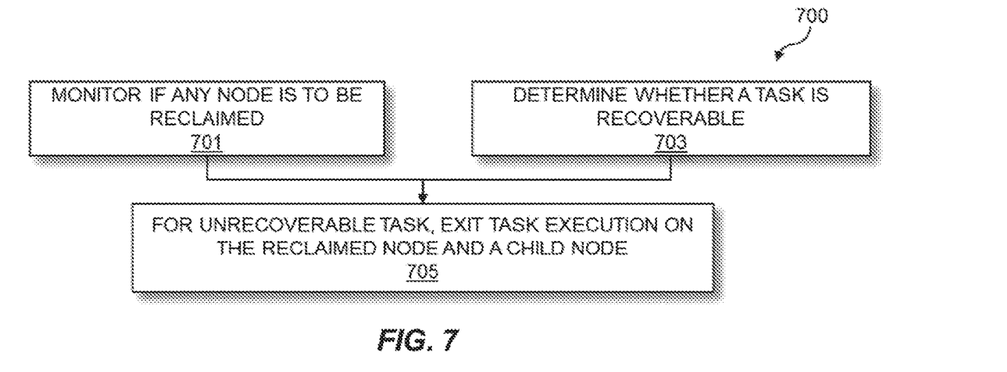
FIG. 7 depicts a flowchart of task failover for an unrecoverable task in accordance with a more detail embodiment of the present invention.

FIG. 7 depicts a flowchart of task failover process 700 for an unrecoverable task in accordance with a more detail embodiment of the present invention. In a step 701, a processing unit can monitor if any node of the plurality of reclaimable nodes is to be reclaimed. In a step 703, a processing unit can determine whether a task on any node of the plurality of reclaimable nodes is recoverable. In accordance with embodiments of the present invention, the step 703 can be performed in parallel with the step 701. Since step 701 and step 703 in process 700 represent the same or similar steps in step 401 and step 403 of FIG. 4 respectively, so details of those steps will not be further repeated hereinafter. In step 705, responsive to a node being reclaimed and the task being unrecoverable, a processing unit exit corresponding execution of the unrecoverable task on the reclaimed node and task execution associated with the unrecoverable task on a child node of the reclaimed node without storing data of corresponding tasks, which may include data of the unrecoverable task on the reclaimed node and data related to the associated task(s) of the unrecoverable task executed on its child nodes.

It should be noted that the method/system/computer program product for task failover according to embodiments of this invention could be implemented by computer system/server 12 of FIG. 1. Embodiments of the present invention can be advantageous as it may enable providing an optimized failover solution in an unstable environment by determining recoverable task, which may thereby save calculation resources, improve calculation efficiency, reduce response time, or improve user experience.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for task failover in a cloud environment, wherein the cloud environment includes a plurality of reclaimable nodes, comprising:
    monitoring, by one or more processing units, if any node of the plurality of reclaimable nodes having one or more child nodes is to be reclaimed for executing other tasks, a reclaimable node executing in a spot instance in the cloud environment and being reclaimable at any time without delay for data storing;
    determining, by one or more processing units, whether a task of the existing tasks on any node of the reclaimable nodes having one or more child nodes is recoverable, the task defined as recoverable if the task has been executed on the one or more child nodes for a period higher than a threshold and an impact will occur if associated task execution in the one or more child nodes is killed, the impact related to wasted calculations associated with task execution in the one or more child nodes;
    storing, by one or more processing units, data of the recoverable task on the reclaimable node remotely in a stable node;
    notifying, by one or more processing units, at least one associated task executed by at least one child node associated with a reclaimed node in the cloud environment to wait without abandoning the at least one associated task which results in a waste of calculation resources and delay of response;
    connecting, by one or more processing units, the child node of the reclaimed node to the stable node which will not be reclaimed to interrupt task execution; and
    continuing execution of the recoverable task and the at least one associated task on the stable node.

2. The method of claim 1, wherein the step of determining whether a task is recoverable is further based on at least one of the following factors associated with the task on the to-be-reclaimed node: task execution time, a task execution percentage, a task execution result size, a number of child nodes, and a number of times of being re-executed.

3. The method of claim 1, wherein monitoring if any node of the plurality of reclaimable nodes is to be reclaimed, determining whether a task of the existing tasks on any node of the plurality of reclaimable nodes is recoverable, and storing data of the recoverable task remotely in the stable node occur in parallel.

4. The method of claim 1, further comprises:
    responsive to the at least one node being reclaimed and the task being unrecoverable, exiting, by one or more processing units, the task execution of the unrecoverable task on the reclaimed node and the task execution associated with the unrecoverable task on the child node of the reclaimed node.

5. A computer program product for task failover in a cloud environment, wherein the cloud environment includes a plurality of reclaimable nodes, the computer program product comprising:
    a computer readable storage medium having program instructions embodied therewith, the program instructions being executable by a computer to cause the computer to perform a method comprising:
        monitoring if any node of the plurality of reclaimable nodes having one or more child nodes is to be reclaimed for executing other tasks, a reclaimable node executing in a spot instance in the cloud environment and being reclaimable at any time without delay for data storing;
        determining whether a task of the existing tasks on any node of the reclaimable nodes having one or more child nodes is recoverable, the task defined as recoverable if the task has been executed on the one or more child nodes for a period higher than a threshold and an impact will occur if associated task execution in one or more child nodes is killed, the impact related to wasted calculations associated with task execution in the one or more child nodes;
        storing data of the recoverable task on the reclaimable node remotely in a stable node;
        notifying at least one associated task executed by at least one child node associated with a reclaimed node in the cloud environment to wait without abandoning the at least one associated task which results in a waste of calculation resources and delay of response;

connecting the child node of the reclaimed node to the stable node which will not be reclaimed to interrupt task execution; and continuing execution of the recoverable task and the at least one associated task on the stable node.

6. The computer program product of claim 1, wherein the step of determining whether a task is recoverable is further based on at least one of the following factors associated with the task on the reclaimed node: task execution time, a task execution percentage, a task execution result size, a number of child nodes, and a number of times of being re-executed.

7. A computer system for task failover in a cloud environment, wherein the cloud environment includes a plurality of reclaimable nodes, comprising:

one or more processors;

a memory coupled to at least one of the processors; and a set of computer program instructions stored in the memory and executed by at least one of the processors to perform a method comprising:

monitoring if any node of the plurality of reclaimable nodes having one or more child nodes is to be reclaimed for executing other tasks, a reclaimable node executing in a spot instance in the cloud environment and being reclaimable at any time without delay for data storing;

determining whether a task of the existing tasks on any node of the reclaimable nodes having one or more child nodes is recoverable, the task defined as recoverable if the task has been executed on the one or more child nodes for a period higher than a threshold and an impact will occur if associated task execution in the one or more child nodes is killed, the impact related to wasted calculations associated with task execution in the one or more child nodes;

storing data of the recoverable task on the reclaimable node remotely in a stable node;

notifying at least one associated task executed by at least one child node associated with a reclaimed node in the cloud environment to wait without abandoning the at least one associated task which results in a waste of calculation resources and delay of response;

connecting, by one or more processing units, the child node of the reclaimed node to the stable node which will not be reclaimed to interrupt task execution; and continuing execution of the recoverable task and the at least one associated task on the stable node.

8. The computer system of claim 7, wherein the step of determining whether a task is recoverable is further based on at least one of the following factors associated with the task on the reclaimed node: task execution time, a task execution percentage, a task execution result size, a number of child nodes, and a number of times of being re-executed.

* * * * *